United States Patent [19]

Frane

[11] Patent Number: 5,025,387
[45] Date of Patent: Jun. 18, 1991

[54] POWER SAVING ARRANGEMENT FOR A CLOCKED DIGITAL CIRCUIT

[75] Inventor: Terrie L. Frane, Bloomingdale, Ill.

[73] Assignee: Motorola, Inc., Schaumburg, Ill.

[21] Appl. No.: 532,157

[22] Filed: Jun. 1, 1990

Related U.S. Application Data

[63] Continuation of Ser. No. 240,320, Sep. 6, 1988, abandoned.

[51] Int. Cl.[5] .................. G06F 1/04; H03K 5/04
[52] U.S. Cl. .................... 364/493; 364/200; 364/273.1; 365/227
[58] Field of Search ........... 364/493, 200, 900, 273.1; 307/269, 271; 328/72; 365/227

[56] References Cited

U.S. PATENT DOCUMENTS

| | | | |
|---|---|---|---|
| 3,941,989 | 3/1976 | McLauglin et al. | 235/156 |
| 4,151,611 | 4/1979 | Sugawara et al. | 365/227 |
| 4,164,666 | 8/1979 | Hirasawa | 364/900 |
| 4,285,043 | 8/1981 | Hashimoto et al. | 364/900 |
| 4,381,552 | 4/1983 | Nockini et al. | 365/227 |
| 4,435,761 | 3/1984 | Kimoto | 364/200 |
| 4,670,837 | 6/1987 | Sheets | 364/200 |
| 4,686,386 | 8/1987 | Tadao | 365/227 |

OTHER PUBLICATIONS

Zilog, Advance Product Specification, Z84C80 GLU, General Logic Unit, Oct. 1986.
"CMOS 280 Clock Generator/Controller", Toshiba Integrated Circuit Technical Data, No. TMPZ84C60P, pp. 273-289.

Primary Examiner—Parshotam S. Lall
Assistant Examiner—Brian M. Mattson
Attorney, Agent, or Firm—Kenneth W. Bolvin

[57] ABSTRACT

A power saving arrangement for a microcomputer having a first clock signal operating at a predetermined frequency employs a reduced clock frequency to peripheral circuitry to limit power consumption during a disable or halt mode. A control circuit disables a clock signal provided to the microcomputer, while a clock divider divides the predetermined frequency to generate a reduced frequency signal upon which the peripheral circuitry may operate. After receiving an external wake-up signal, the peripheral circuitry interrupts the microcomputer in order to revert the microcomputer back to normal operation.

16 Claims, 1 Drawing Sheet

POWER SAVING ARRANGEMENT FOR A CLOCKED DIGITAL CIRCUIT

This is a continuation of application Ser. No. 240,320, filed Sept. 6, 1988, and now abandoned.

FIELD OF THE INVENTION

The present invention relates generally to digital circuits and more particularly, to power saving arrangements for clocked digital circuits.

DESCRIPTION OF THE PRIOR ART

A clocked digital circuit, e.g. a microcomputer circuit comprising a microcomputer (MPU) and its associated peripheral integrated circuits (ICs), consumes a relatively large amount of power. In power conscious applications, it is desirable to curtail power consumption whenever possible. For example, during an MPU halt mode, it would be desirable to significantly, if not completely, curtail the power provided to the MPU. Unfortunately, in order to revert from the halt mode, microcomputer circuits require operating power along with a clock signal.

For this reason, previously known power saving arrangements for digital circuits have been somewhat successful in reducing the power provided to the digital circuits by disabling the clock signal to the entire digital circuit, e.g. disabling the clock signal to both the MPU and its peripheral circuits. Unfortunately, because many of these digital circuits require a clock signal provided thereto in order to revert to an operating mode, such previously known circuits have required extraneous circuitry to cause this reversion. E.g. a timer circuit, driven by a second clock signal, may be used to allow an MPU to maintain a halt mode for a predetermined period of time. After the period of time lapses, such a timer circuit would generate a signal which interrupts the MPU to cause the reversion.

This type of extraneous circuitry is disadvantageous for two reasons. First, the circuitry is expensive in direct cost and circuit board real estate. Second, this circuitry, operating on the second clock signal, is not acceptable for many power sensitive applications, e.g. battery operated computing devices.

There is therefore a need for a power saving arrangement which overcomes this deficiency.

OBJECTS OF THE PRESENT INVENTION

It is an object of the present invention to provide a power saving arrangement for a clocked digital arrangement which overcomes the aforementioned deficiencies.

It is an additional object of the present invention to provide a power saving arrangement for a clocked digital circuit which reduces power consumption by disabling the clock to one part of the digital circuit during a disable mode, while at the same time providing the clock at a reduced frequency to another part of the circuitry which allows the disabled circuit to be enabled.

It is yet an additional object of the present invention to provide a power saving arrangement for a microcomputer circuit which reduces power consumption by eliminating the clock to the microcomputer circuit during a halt mode while at the same time providing the clock at a reduced frequency to peripheral circuitry which allows the halted microcomputer circuit to be interrupted to revert from the halt mode.

DETAILED DESCRIPTION OF THE PREFERRED EMBODIMENT

Figure 1:
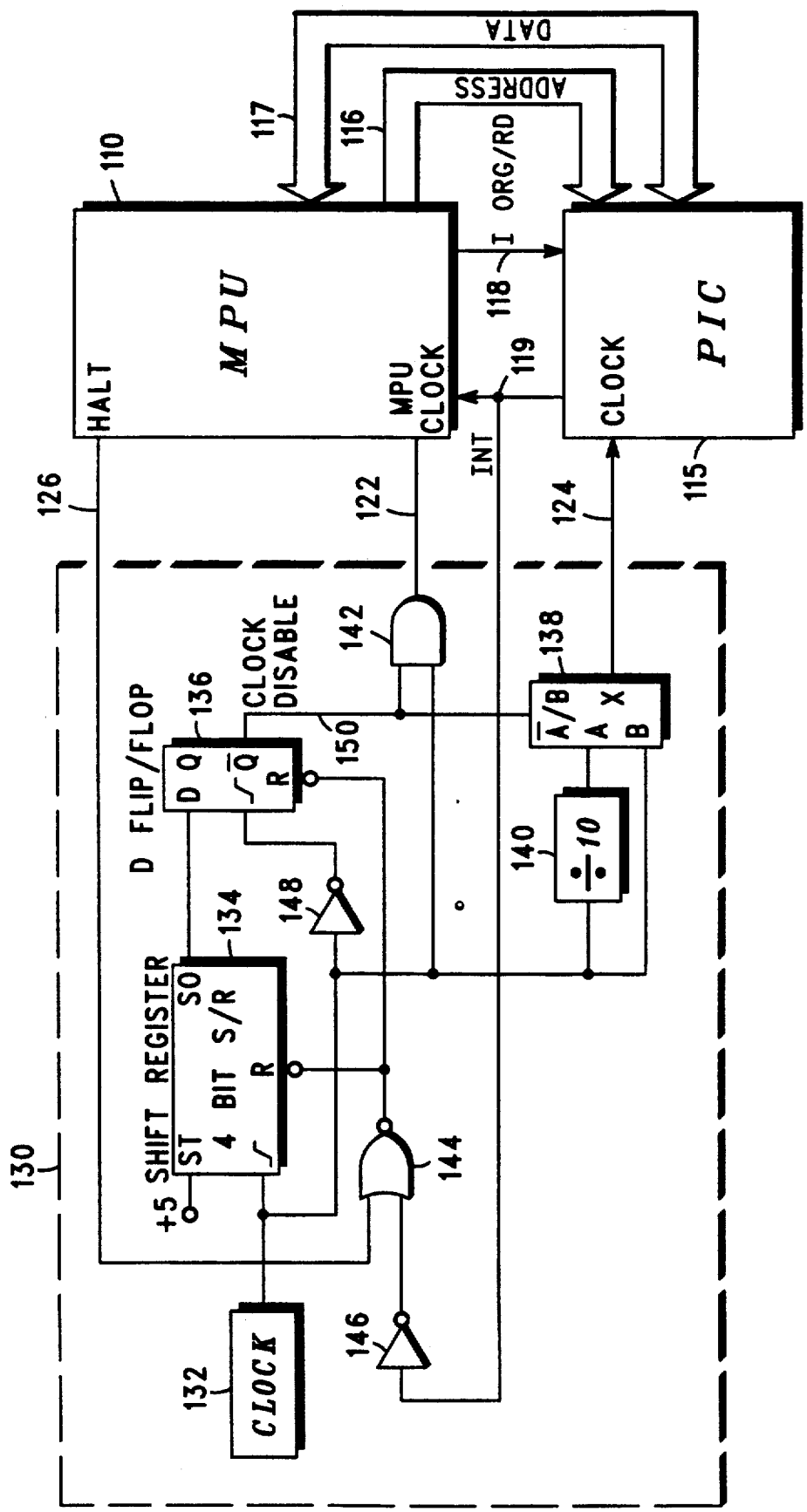
FIGURE 1 is a block diagram of a power saving arrangement according to the present invention.

The present invention is directed to power saving arrangement for a clock digital circuit. More specifically, the present invention directed to an arrangement in a method for significantly reducing the power consumed by a microcomputer and its associated peripheral ICs.

FIGURE 1 illustrates such a power saving arrangement for a microcomputer circuit. The arrangement includes a microcomputer (MPU), such as a Z80 available, e.g. from Zilog, Inc., and an associated peripheral IC (PIC) 115 to the MPU 110. Using the exemplary Z80 MPU, the PIC 115 may be an associated PIO, CTC or SIO, each available from Zilog, Inc.

The MPU 110 and the PIC 115 are conventionally intercoupled with interface signals including an address bus 116, data bus 117, an IORQ/RD signal 118 and an interrupt (INT) signal 119. An MPU clock signal 122 is provided to the MPU 110 (while a peripheral clock signal 124 is provided to the PIC 115.

The MPU clock signal 122 and the peripheral clock signal 124 are essential aspects of the power saving arrangement according to the present invention. These clock signals 122 and 124 are used by a control circuit 130 in combination with a halt signal 126 (provided by the MPU 110) and the interrupt signal 119 (provided by the PIC 115) to provide the MPU clock signal 122 and the peripheral clock signal 124 in an inventive power saving arrangement.

The control circuit 130 includes a variety of conventional digital circuits that are intercoupled and operative in a novel manner, according to the present invention. These conventional digital circuits include a clock generator 132, a four bit shift register 134, a flip-flop 136, a data selector 138, a (divide-by-ten) divider circuit 140, and an AND gate 142, a NOR gate 144 and two invertors 146 and 148. During normal operation, the halt line is in a binary high state (high), the shift register 134 and the flip-flop 136 are held in a reset mode, and a clock disable signal 150 is provided by the flip-flop 136 to allow the output of the clock generator 132 to pass through the AND gate 142. In this mode, the clock disable signal 150, being inactive, also allows the data selector 138 to pass the output of the clock generator 132 to the PIC 115. Thus, under normal operation, both the MPU 110 and the PIC 115 operate at full speed.

Operation under the power saving mode, according to the present invention, is as follows. When the MPU 110 indicates that it is in a disable mode, as indicated by the halt signal 126, the interrupt signal 119 provided by the PIC 115 is high (indicating that there is no interrupt) and the shift register 134 and the flip-flop 136 are released from the reset mode. The next rising edge of the signal provided by the clock generator 132 causes a logic high at the SI input of the shift register 134 to be shifted into its first stage. With the next three subsequent rising edges of the signal provided by the clock generator 132, this shifting at the shift register 134 continues until the logic high at the SI input is shifted into the last stage of the shift register. At this juncture, a logic high appears at the shift register's SO output. Once again referring to the output of the clock generator 132, on the next falling edge of the signal provided by the clock generator 132, via invertor 148, the data at the SO output of the shift register 134 is latched into the flip-flop 136. This causes the clock disable signal 150 to go low, thereby preventing the MPU clock signal from passing through AND gate 142 to the MPU 110. The clock disable signal 150 transiting to the low state also selects channel A of the data selector 138 to allow the divider circuit 140 to provide its output signal to the PIC 115. In this mode, the MPU 110 does not receive a clock signal, and the PIC 115 receives a clock signal having a frequency that is significantly less than frequency of the clock signal it receives during normal operation, i.e. 1/10th its normal rate. This substantially reduces the power consumed by the MPU. Additionally, the PIC 115 is consequently running at a slower rate and, therefore, is consuming a significantly reduced amount of power, but is still active and able to generate an interrupt to the MPU 110 to bring it out of the disable (halt) mode.

When the PIC 115 brings the MPU 110 out of the disable mode, the interrupt signal 119 is provided to the MPU 110 and also, via the invertor 146 and the NOR gate 144, to the shift register 134 and the flip-flop 136. This causes the shift register 134 and the flip-flop 136 to be held in the reset mode once again. Consequently, the clock disable signal 150 transists high to allow the MPU 110 to receive its normal and operative MPU clock, and the data selector 138 is switched to the channel B input which causes the output of the clock generator 132 to pass through to the PIC 115. From this point, the MPU 110 processes the interrupt request provided by the PIC 115.

One skilled in the art will recognize that the embodiment shown in FIGURE 1 is merely a preferred embodiment according to the present invention. There are, of course, various arrangements that can be used to provide the afore-discussed functions.

We claim:

1. A power control apparatus for a digital circuit having control means for generating an interrupt signal, processing means for generating a disable signal, and clocking means for generating a first clock signal at a first predetermined frequency, the power control apparatus comprising:
    a) disabling means having an input coupled to the first clock signal and an output, generating a second clock signal at the first predetermined frequency, coupled to the processing means, for disabling the second clock signal in response to the disable signal, and enabling the second clock signal in response to the interrupt signal; and
    b) means, having an input coupled to the first clock signal and an output, generating a third clock signal at the first predetermined frequency, coupled to the control means, for reducing in response to the disable signal, the first predetermined frequency of the third clock signal to a second predetermined frequency, and increasing in response to the interrupt signal, the second predetermined frequency to the first predetermined frequency;
    wherein the processing means consumes substantially no power when the second clock signal is disabled and the control means consumes less power when the first predetermined frequency of the third clock signal is reduced to the second predetermined frequency.

2. The apparatus of claim 1 wherein the control means comprises a peripheral input/output integrated circuit.

3. The apparatus of claim 1 wherein the processing means is a microprocessor.

4. The apparatus of claim 1 wherein the means for reducing comprises frequency dividing means.

5. The apparatus of claim 1 wherein the second predetermined frequency is one tenth of the first predetermined frequency.

6. A power control apparatus for a digital electronic circuit having processing means for generating a halt signal, a peripheral circuit for generating an interrupt signal, and clocking means for generating a first clock signal at a first predetermined frequency, the power control apparatus comprising:
    a) control means, having a first input coupled to the first clock signal, a second input coupled to the halt signal, and a third input coupled to the interrupt signal, for generating a disabling signal in response to the halt signal and an enabling signal in response to the interrupt signal;
    b) means, having a first input coupled to an output of the control means, a second input coupled to the first clock signal, and an output, generating a second clock signal at the first predetermined frequency, coupled to the processing means, for disabling the second clock signal in response to the disabling signal, and enabling the second clock signal in response to the enabling signal; and
    c) means, having an input coupled to the first clock signal and an output, generating a third clock signal at the first predetermined frequency, coupled to the control means, for reducing, in response to the disabling signal, the first predetermined frequency to a second predetermined frequency, and increasing, in response to the enabling signal, the second predetermined frequency to the first predetermined frequency;
    wherein the processing means consumes substantially no power when the second clock signal is stopped and the peripheral circuit consumes less power when the first predetermined frequency of the third clock signal is reduced to the second predetermined frequency.

7. The apparatus of claim 6 wherein the disabling means is a logical AND gate.

8. The apparatus of claim 6 wherein the control means includes a shift register having an input clocked by the clock signal and an output coupled to an input of a D type flip flop, the D type flip flop having an output that produces the control signal.

9. The apparatus of claim 6 wherein the means for reducing comprises frequency dividing means.

10. The apparatus of claim 6 wherein the processing means is a microprocessor.

11. The apparatus of claim 6 wherein the second predetermined frequency is one tenth of the first predetermined frequency.

12. An electronic circuit having a plurality of electronic components, processing means for generating a disable signal, a peripheral circuit for generating an interrupt signal, clocking means for generating a first clock signal at a first predetermined frequency, and a power control apparatus, the power control apparatus comprising:

a) disabling means, generating a second clock signal at the first predetermined frequency, coupled to the processing means and the first clock signal, for disabling the second clock signal clocking in response to the disable signal, and enabling the second clock signal in response to the interrupt signal; and b) means, generating a third clock signal at the first predetermined frequency, coupled to the first clock signal and the peripheral circuit, for reducing, in response to the disable signal, the first predetermined frequency of the third clock signal to a second predetermined frequency, and increasing, in response to the interrupt signal, the second predetermined frequency to the first predetermined frequency;

wherein the processing means consumes substantially no power when the second clock signal is disabled and the control means consumes less power when the first predetermined frequency of the third clock signal is reduced to the second predetermined frequency.

13. The apparatus of claim 12 wherein the control means comprises a peripheral input/output integrated circuit.

14. The apparatus of claim 12 wherein the processing means is a microprocessor.

15. The apparatus of claim 12 wherein the means for reducing comprises frequency dividing means.

16. The apparatus of claim 12 wherein the second predetermined frequency is one tenth of the first predetermined frequency.

* * * * *